United States Patent Office 3,430,686
Patented Mar. 4, 1969

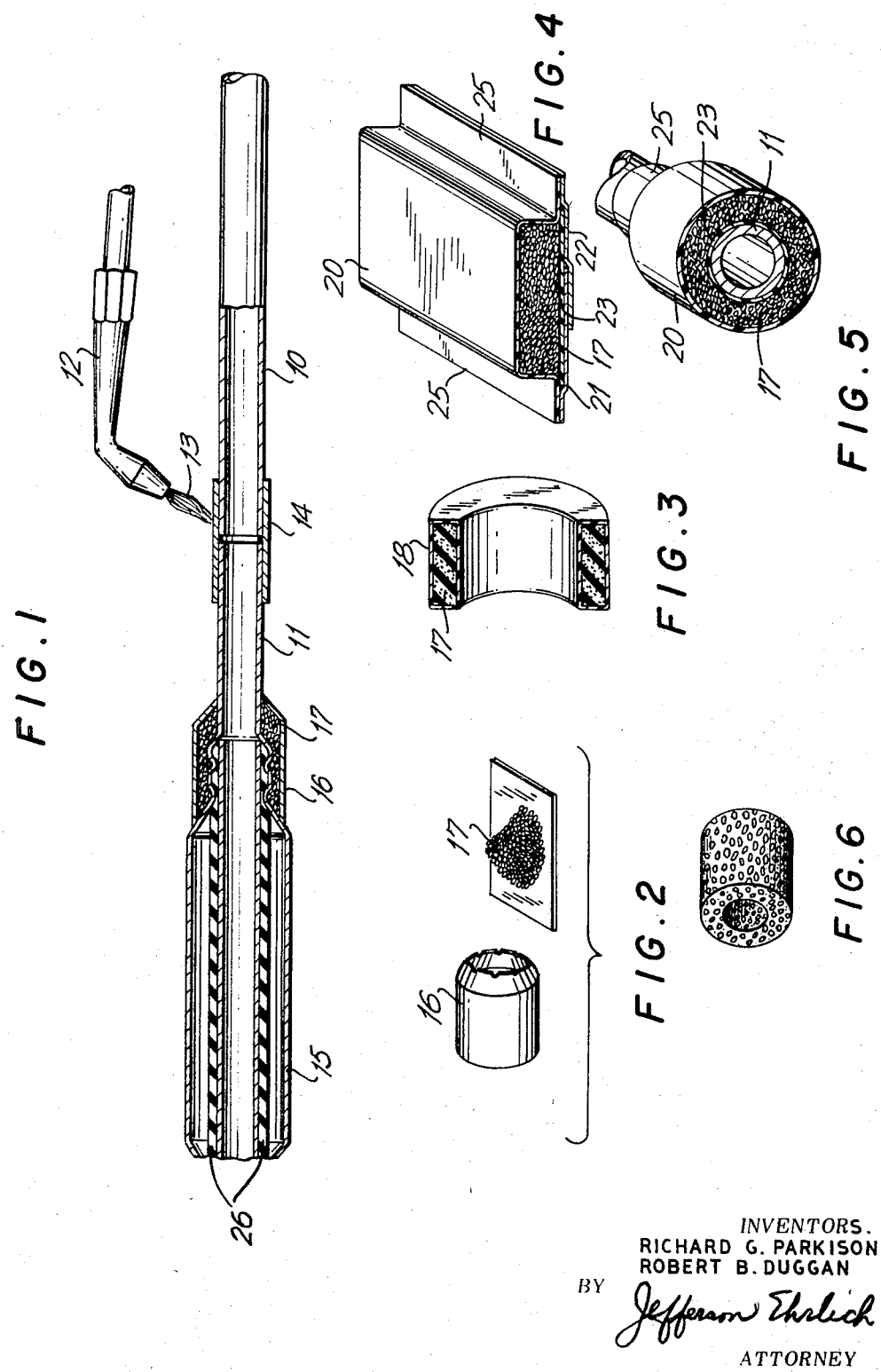

3,430,686
HEAT SHIELD FOR SOLDERING PLUMBING LINES
Richard Grant Parkison and Robert Beaman Duggan, Louisville, Ky., assignors to American Standard Inc., New York, N.Y., a corporation of Delaware
Filed Oct. 31, 1967, Ser. No. 679,452
U.S. Cl. 165—1                    15 Claims
Int. Cl. F28f 13/14

ABSTRACT OF THE DISCLOSURE

A heat shield for protecting an article subject to destructive temperatures arising from welding or soldering operation consisting of a microencapsulated coolant applied to the surface of the article intermediate the source of heat and the area to be protected. The encapsulant may consist of a polymeric material, for example, wax, having a melting point at a temperature below the destructive temperature of the article in order to release a coolant, such as water, so that the coolant may evaporate from the article during the application of heat thereto.

---

This invention relates to an improved heat shield for protecting articles during soldering and welding operations or during other heat treatment processes.

More specifically, this invention relates to a heat evaporative shield for surrounding a pipe or other fixture during soldering or welding or other heat treatment operations for the protection of the insulation or other materials associated with the pipe during such heat treatment operations.

In maintenance and repair applications, it is customary for plumbers and repair men to utilize heat shields to protect the low temperature properties of various fixtures connected along pipes or other devices when welding or soldering operations are performed on the pipe. To protect temperature sensitive articles such as gaskets, washers, rubber tubes and the like, plumbers often wrap pipe to be welded with a damp cloth or other coolant in order to protect the articles from the destructive effects of rising temperatures. These conventional heat shields, however, are often difficult to apply and maintain and sometimes cause water damage in the surrounding area. Moreover, the conventional heat shields are time consuming for a plumber to set up and disassemble.

Accordingly, the present invention provides a heat shield consisting of microencapsulated droplets of a coolant, such as water, which become released upon contact with a surface which is sufficiently heated so as to cause a substantial rise in temperature. The heat shield, according to the invention, may be wrapped, for example in a container made of a plastic material or of a porous material around a pipe or other structure in the area which separates the temperature sensitive article or fixture connected to the pipe from the area of the pipe to which heat is to be applied. In one embodiment where the microencapsulant is contained within the pocket or other container of a tape, a plumber or repairman may cut off a piece of the tape and wrap as many turns as desired around the pipe. The tape, due to its self-adhesive properties, will stick to the pipe during the soldering or welding operation. The center portion of the tape provides a hollow channel into which is stored the microencapsulated coolant. The coolant is, in essence, in thermal contact with the surface of the pipe. As the temperature of the pipe begins to rise during a soldering or welding operation, the capsules containing the coolant will begin to melt, causing the coolant to slowly evaporate and dissipate the heat travelling in the pipe. The rate and amount of evaporation will correspond to the temperature developed by the heating operation and its duration. The microencapsulated coolant will prevent the temperature of the article from becoming excessive by its gradual release of coolant during the application of heat. After the heat has been removed, the heat shield, according to the invention, may be easily disassembled from the pipe and discarded, or the heat shield may be reused if a sufficient amount of unevaporated microencapsulated coolant remains therein.

The heat shield, according to the invention, containing the encapsulated coolant is portable and requires no external chemicals or coolants for its application. It may be readily and easily applied to pipes and other fixtures requiring heat shields, particularly in areas where no other sources of coolants are available. The heat shield also protects the surrounding area from chemical damage since the coolant evaporates as it becomes exposed to the heat. The heat shield, according to the invention, may also be provided as a sleeve, coupling, or other shape, in order to meet the needs of particular applications.

It is therefore, an object, according to the present invention, to provide a heat shield which utilizes a microencapsulated coolant for protecting fixtures and other components which become exposed to heat during welding and soldering operations.

It is another object, according to the present invention, to provide a heat shield consisting of a microencapsulated coolant which may be easily and readily applied to a surface requiring temperature protection.

It is still a further object, according to the present invention, to provide a heat shield having microencapsulated coolant which is simple in design, easy to manufacture and reliable in operation.

Other objects and features of the present invention will become apparent from the following detailed description considered in connection with the accompanying drawings which disclose a few embodiments of the invention. It should be understood, however, that the drawings are designed for the purpose of illustration only and not as a definition of the limits of the invention as to which reference should be made to the appended claims.

The drawings wherein similar reference characters denote similar elements throughout the several views:

FIG. 1 is a cross-sectional view of a pipe connection being soldered and including the heat shield according to the invention;

FIG. 2 is a detailed view of the heat shield of FIG. 1;

FIG. 3 is a view, partly in cross-section, of another embodiment of the heat shield;

FIG. 4 is a view, partly in cross-section, of the heat shield in the form of an adhesive tape;

FIG. 5 is a view, partly in cross-section, of the embodiment of FIG. 4 applied to a section of pipe; and FIG. 6 shows a form of sleeve or other configuration in which encapsulated coolant elements are "cohered" for use in accordance with this invention.

Referring to FIG. 1 there is shown a cross-sectional view of a pipe coupling 14 being soldered by means of the flame 13 of torch 12 to join together the ends of pipes 10 and 11. It is obvious that during the soldering of coupling 14, heat from flame 13 will travel in both directions away from the coupling along pipes 10 and 11. Formed within pipe 11 is a rubber fitting 26 which may be subject to damage by the temperatures produced in coupling 14.

Prior to the insertion of pipe 11 into coupling 14, a boot or sleeve 16 containing a microencapsulated coolant 17 has been inserted over the area of pipe 11 requiring thermal protection. The boot or sleeve 16, as shown in detail in FIG. 2, may be constructed of a resilient material to fit snugly around pipe 11 when filled with coolant 17. Coolant 17 may be packaged inside sleeve 16 or provided separately and consists of a multitude of miniature capsules of coolant coated with a polymeric material. The coolant may consist of water or other substance which has a boiling point appropriate for the application and is not harmful or dangerous in its gaseous or vapor state. The polymeric coating surrounding the coolant may be designed to melt at any desired temperature in order to expose the coolant to the surface of pipe 11. In typical plumbing applications where copper pipe is joined to fittings by soldering, the polymeric coating which may be wax, for example, may be designed to melt at 180° F. in order to provide thermal protection.

FIG. 3 illustrates another embodiment of the heat shield according to the invention utilizing a cylindrical collar 18, having a hollow center portion for containing the microencapsulated coolant 17. Heat shield collar 18 may be produced in a variety of diameters to match the outer diameter of conventional pipes, and may be constructed from a thin-walled elastic material to permit thermal contact with the surface of the pipe.

FIG. 4 illustrates the use of the heat shield constructed in the form of a strip of tape which may be spirally or circularly wrapped over the surface of the pipe or other fitting. Heat shield tape 20 includes a hollow center portion for containing the microencapsulated coolant 17. A heat conducting barrier 23 separates the coolant from the surface of the pipe after the adhesive on flanges 25 of tape 20 becomes exposed by the removal of protective strips 21 and 22.

FIG. 5 illustrates the application of one wrapping of tape 20 around the circumference of pipe 11. The adhesive of tape 20 which need only be applied along the narrow flanges 25 on either side of the encapsulant will serve to hold the tape 20 against the surface of pipe 11. The heat produced by the welding or soldering of pipe 11 will be transmitted through conductive surface 23 to melt the polymeric coating which surrounds each of the capsules containing the coolant so as to cause the coolant to evaporate and dissipate the heat in pipe 11.

FIG. 6 illustrates a package of microencapsulated coolant members 17 formed into the shape of a sleeve, and having no outer covering or enclosure, but the coolant elements 17 are packed to retain the indicated shape. If the elements 17 are made of wax each enclosing a globule or globules of water or other fluid, the elements may be caused to stick together by ordinary pressure. The shape may be retained at ordinary temperatures, but the elements 17 will disintegrate in response to elevated temperatures, as during a soldering or welding process. If the outer material of the individual elements 17 is not adhesive, it may be preferred to employ on adhesive component to produce the integrated sleeve-like formation between the elements 17.

The capsules containing coolant 17 will melt slowly as the heat is dissipated by evaporation so that a continuous and uniform cooling of pipe 11 may be achieved during welding or soldering operations. Where prolonged heating operations are anticipated, additional amounts of heat shield material may be wrapped around pipe 11. After the pipe coupling has been completed, the heat shield tape 20 may be easily removed from the surface of pipe 11 and discarded leaving no residue or damage to the pipe and its surrounding area.

While only a few embodiments of the present invention have been shown and described, it will be understood that many changes and modifications may be made thereunto without departing from the spirit and scope of the invention as defined by the appended claims.

What is claimed is:

1. A heat shield for protecting an article from the destructive effects caused by heating comprising:
an encapsulated coolant applied to a surface of the article intermediate an area to be heated and an area requiring thermal protection, said encapsulant being designed to release said coolant at a temperature below that at which destructive effects occur.

2. The heat shield as recited in claim 1 wherein said encapsulant is constructed from a polymeric material having a predetermined melting temperature.

3. The heat shield as recited in claim 2 wherein said coolant contained within said encapsulant is water.

4. The heat shield as recited in claim 3 additionally comprising thin-walled container means for holding and supporting said encapsulated coolant against the surface of said article.

5. The heat shield as recited in claim 4 wherein said container means comprises a hollow sleeve compressively retained against the surface of said article.

6. The heat shield, as recited in claim 4, wherein said container means comprises a flexible tape.

7. The heat shield, as recited in claim 6, wherein said tape includes an adhesive portion for securing it to the surface of said article.

8. A method for applying a heat shield to an article subject to the application of heat comprising the steps of; applying an encapsulated coolant to the surface of the article, allowing the encapsulant to melt when the article is heated above a predetermined temperature, releasing the coolant as the encapsulant melts, and evaporating the coolant from the surface of the article while it is being heated.

9. The method of protecting an article which is to be subjected to heat, which consists in interposing an encapsulated coolant between the article and the source of heat, melting said encapsulated coolant as the heat raises said coolant above a predetermined temperature, and releasing the coolant at or in the region of said article in response to any rise in temperature above the predetermined value, so that said coolant will maintain said article below a temperature which may impair said article.

10. Apparatus for protecting an article against impairment by soldering, welding or other source of heat, comprising an encapsulated coolant, said encapsulant being designed to release said coolant at a temperature below that at which destructive effects occur, means to apply said encapsulated coolant to an article so that heat applied to the article will evaporate said coolant to maintain said article below a temperature at which it may be impaired.

11. Apparatus according to claim 10 in which said coolant is contained in a thin-walled container.

12. Apparatus according to claim 11 in which the thin-walled container is made of a plastic material.

13. Apparatus according to claim 11 in which the thin-walled container is in the form of a tape.

14. Apparatus according to claim 10 in which the coolant is formed into a coherent integrated mass shaped as a sleeve so that it may be wrapped around an article to be protected.

15. Apparatus according to claim 14 in which the coolant is composed of a multiplicity of encapsulated particles which adhere to each other at normal temperatures.

References Cited

UNITED STATES PATENTS

| | | | |
|---|---|---|---|
| 2,547,886 | 4/1951 | Poux | 62—530 |
| 2,562,121 | 7/1951 | Poux | 62—530 X |
| 2,800,456 | 7/1957 | Shepherd | 62—66 X |
| 3,291,476 | 12/1966 | Calbin | 228—57 X |

FOREIGN PATENTS 600,823  6/1960  Canada.

ROBERT A. O'LEARY, *Primary Examiner.*
ALBERT W. DAVIS, *Assistant Examiner.*

U.S. Cl. X.R.

29—488; 62—467; 228—46, 59